(12) United States Patent
Teuwen et al.

(10) Patent No.: US 10,102,522 B2
(45) Date of Patent: Oct. 16, 2018

(54) DIGITAL WALLET BRIDGE

(71) Applicant: NXP B.V., Eindhoven (NL)

(72) Inventors: Philippe Teuwen, Etterbeek (BE); Cedric Colnot, Uccle (BE)

(73) Assignee: NXP B.V., Eindhoven (NL)

( * ) Notice: Subject to any disclaimer, the term of this patent is extended or adjusted under 35 U.S.C. 154(b) by 296 days.

(21) Appl. No.: 13/855,621

(22) Filed: Apr. 2, 2013

(65) Prior Publication Data

US 2014/0291392 A1 Oct. 2, 2014

(51) Int. Cl.
*G06Q 20/36* (2012.01)
*G06Q 20/32* (2012.01)
*G06Q 20/34* (2012.01)

(52) U.S. Cl.
CPC ....... *G06Q 20/367* (2013.01); *G06Q 20/3226* (2013.01); *G06Q 20/3278* (2013.01); *G06Q 20/341* (2013.01); *G06Q 20/352* (2013.01); *G06Q 20/353* (2013.01); *G06Q 20/357* (2013.01)

(58) Field of Classification Search
CPC ........... G06K 19/0723; G06K 19/0724; G06Q 20/352; G06Q 20/367; G06Q 20/34
USPC .................................................. 235/380, 492
See application file for complete search history.

(56) References Cited

U.S. PATENT DOCUMENTS

| | | | |
|---|---|---|---|
| 6,880,761 B1 | 4/2005 | Ritter | |
| 8,285,329 B1 | 10/2012 | Zhu | |
| 8,942,992 B1 | 1/2015 | Zhu | |
| 2005/0247797 A1 | 11/2005 | Ramachandran | |
| 2009/0179817 A1* | 7/2009 | Yin | 343/866 |
| 2011/0137803 A1* | 6/2011 | Willins | 705/67 |
| 2011/0314539 A1* | 12/2011 | Horton | 726/20 |
| 2012/0061476 A1* | 3/2012 | Le Garrec et al. | 235/492 |
| 2012/0074232 A1 | 3/2012 | Spodak et al. | |
| 2012/0233681 A1* | 9/2012 | Adams et al. | 726/7 |
| 2012/0303425 A1 | 11/2012 | Katzin et al. | |
| 2012/0310826 A1 | 12/2012 | Chatterjee | |
| 2013/0013499 A1 | 1/2013 | Kalgi | |
| 2013/0024364 A1* | 1/2013 | Shrivastava et al. | 705/39 |
| 2013/0024372 A1 | 1/2013 | Spodak et al. | |
| 2013/0080238 A1* | 3/2013 | Kelly et al. | 705/14.31 |
| 2013/0091551 A1 | 4/2013 | Rajakarunanayake et al. | |
| 2013/0159154 A1 | 6/2013 | Purves et al. | |
| 2013/0166332 A1* | 6/2013 | Hammad | 705/5 |

(Continued)

FOREIGN PATENT DOCUMENTS

EP 1 341 105 A1 9/2003
EP 1 560 172 A1 8/2005

(Continued)

OTHER PUBLICATIONS

"Virtual SE for mPayment—Chip to Cloud" Inside Secure, 17 pgs, retrieved from the Internet at: www.insidesecure.com/ . . ./Virtual+ SE +for+mPayment+-+Chip+to+Clo.. (Sep. 20, 2012)

(Continued)

*Primary Examiner* — Allyson Trail

(57) ABSTRACT

A smartcard communicating simultaneously with a smart phone and a point of sale, thereby allowing the smartcard to act as a bridge between the point of sale and the smart phone. The smart card is typically powered by the point of sale and typically communicates with the smart phone using BLUETOOTH Low Energy (BLE).

6 Claims, 4 Drawing Sheets

(56) References Cited

U.S. PATENT DOCUMENTS

| | | | |
|---|---|---|---|
| 2013/0218765 A1 | 8/2013 | Hammad | |
| 2013/0300582 A1* | 11/2013 | McNamara et al. | 340/905 |
| 2013/0339232 A1 | 12/2013 | Desai et al. | |
| 2013/0346302 A1 | 12/2013 | Purves et al. | |
| 2014/0006277 A1 | 1/2014 | Rao | |
| 2014/0052654 A1* | 2/2014 | Curetti et al. | 705/318 |
| 2014/0074637 A1 | 3/2014 | Hammad | |
| 2014/0076967 A1* | 3/2014 | Pushkin et al. | 235/380 |
| 2014/0081857 A1* | 3/2014 | Bonalle et al. | 705/41 |
| 2014/0093144 A1* | 4/2014 | Feekes | 382/124 |
| 2014/0108265 A1* | 4/2014 | Hayhow et al. | 705/71 |
| 2014/0137235 A1* | 5/2014 | Horton | 726/20 |
| 2014/0172700 A1 | 6/2014 | Teuwen et al. | |
| 2014/0180851 A1* | 6/2014 | Fisher | 705/16 |
| 2014/0196138 A1* | 7/2014 | Tsai et al. | 726/9 |

FOREIGN PATENT DOCUMENTS

| | | |
|---|---|---|
| EP | 2 284 783 A1 | 2/2011 |
| EP | 2 383 690 A1 | 11/2011 |
| TW | 201240371 A1 | 10/2012 |
| WO | 99/52066 A1 | 10/1999 |
| WO | 01/09851 A1 | 2/2001 |
| WO | 01/37199 A1 | 5/2001 |
| WO | 2009/039419 A1 | 3/2009 |

OTHER PUBLICATIONS

Ruddock, D. "Introducing: The Physical Google Wallet Card—Coming Soon to Google Wallet, and More New Features", Android OS, News, 8 pages http://www.androidpolice.com/2012/11/01/introducing-the-physical-google-wallet-card-coming-soon-to-google-wallet-and-more-new-features/ (Nov. 1, 2012).

Extended European Search Report for Application 14157043.2 (dated Jul. 17, 2014).

Extended European Search Report for Patent Appln. No. 13197956.9 (dated Jan. 27, 2015).

"Bluetooth low energy", Wikipedia, 12 pgs., retrieved from the internet Jul. 29, 2014: http://en.wikipedia.org/w/index.php?title=Bluetooth_low_energy&oldid=521556064 (Nov. 5, 2012).

"Bluetooth low energy", Wikipedia, 12 pgs., retrieved from the internet Dec. 18, 2012 at: https://en.wikipedia.org/wiki/Bluetooth_low_energy.

"EM Microelectronic—Marin SA", EM Microelectronic—Marin SA, 1 pg., retrieved from the Internet on Dec. 18, 2012: http://www.emmicroelectronic.com/Products.asp?IdProduct=289 (2012).

"iZettle—Now anyone can take card payments", iZettle, 3 pgs., retrieved from the Internet on Dec. 18, 2012: http://www.icarte.ca/features110.shtml.

"iCarte", iCarte, 1 pg., retrieved from the Internet on Dec. 18, 2012: http://www.icarte.ca/featuresllO.shtml (2012).

\* cited by examiner

DIGITAL WALLET BRIDGE

The current developments in mobile payments is leading to the dematerialization of smart cards (e.g. credit cards) into a virtual wallet which is typically made possible at an electronic transaction terminal such as the point of sale (POS) by, for example, a Near Field Communication (NFC) enabled phone. For secure and efficient use, a Secure Element (SE) is typically needed in the mobile or smart phone to house a digital wallet. If the mobile phone does not have a secure element, secure online connectivity to a cloud is typically required for transactions using a virtual wallet stored in a cloud. The cloud is defined to be a communications network such as, for example, the Internet. Smart phones typically do not have ISO7816 (international standard related to electronic identification cards with contacts) connectivity so that mobile phones need to be equipped with, for example, NFC capability and additionally there needs to be NFC transaction terminal capability at the point of sale (POS). NFC transaction terminal capability typically requires significant additional investment by the merchant and during the transition away from a smart card to the virtual wallet using NFC, a merchant and the card issuer will typically need to support both solutions (virtual and physical cards). However, smart phones today typically have BLUETOOTH capability for headset connectivity.

DETAILED DESCRIPTION

In accordance with the invention, interoperability between various payment solutions is provided by adding mobile payment capability to typical bank cards such as, for example, personal account number (PAN) embossed cards, magnetic stripe cards, contact cards and contactless cards by having the card interface to a smart phone and the POS. The smart phone interfaces to the cloud. Typical elements in accordance with the invention are the cloud, smart phone, smartcard and POS. Each communication link may be built on a number of technologies. The communication link between the cloud and the smart phone may be Wi-Fi, 3G, 4G or other suitable data connection. The communication link between the smart phone and the smartcard is typically compliant with existing smart phone wireless low power short range connectivity solutions such as BLUETOOTH Low Energy (BLE) or NFC (Near Field Communication), for example. The communication link between the smartcard and the POS is compliant with the POS connectivity such as ISO 7816 (contact card) and /or ISO 14443 (contactless/NFC card). The smartcard is powered by the POS typically via the ISO 7816 contacts and/or ISO 14443 (contactless/NFC).

In accordance with the invention, all communication links between the smart phone and the smartcard must be authenticated and secured. Hence, an initial pairing between the digital wallet and the smartcard is typically required. The initial pairing may occur via pre-personalization, bootstrapped using a shared secret (e.g. using a number on a scratch card) or performed by an accredited retailer.

Figure 1:
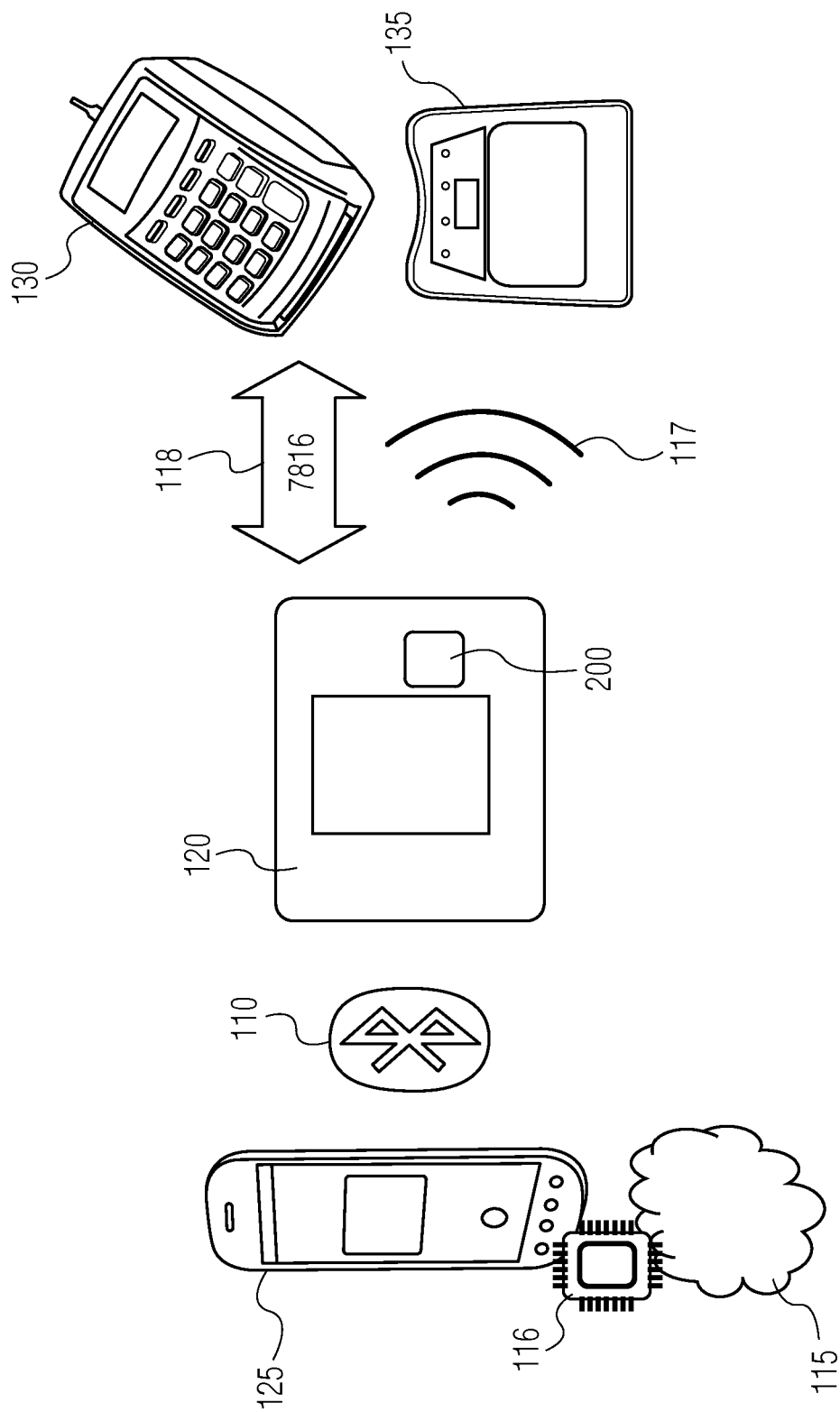
FIG. 1 shows an embodiment in accordance with the invention.

In an embodiment in accordance with the invention shown in FIG. 1, ISO 7816 and/or ISO 14443 (contactless/NFC) connectivity to the POS is provided for the digital wallet (not shown) located either in smart phone 125 or cloud 115 using smartcard 120, typically in its classical ISO 7816 shape. Smartcard 120 allows the digital wallet to communicate with ISO 7816 POS 130 or ISO 14443 POS 135 using smartcard 120 as the interface between POS 130 or POS 135 and smart phone 125. The digital wallet may reside in virtual SE 116 in cloud 115 or in real SE 116 in smart phone 125 and communication occurs between SE 116 via smart phone 125 and POS 130 or 135 via ISO 7816 communication link 118 or ISO 14443 communication link 117, respectively. Smartcard 120 functions as a bridge between incompatible technologies such as, for example, POS 130 or POS 135 and smart phone 125 being BLUETOOTH Low Energy (BLE) 110 enabled.

In an embodiment in accordance with the invention, smartcard 120 may be equipped with SE 540 (see FIGS. 4 and 5) having a functionality typical of conventional bank card SEs. SE 540 typically supports one or two payment schemes and is already appropriately certified or smartcard 120 may not have an SE. Note that communication link (2) between POS 430 or 435 and smart phone 425 does not rely on the SE 540 of smartcard 420 (see FIGS. 4 and 5). In an embodiment in accordance with the invention, smartcard 120 may lack SE 540 (see FIG. 2).

Typically, smartcard 120 is typically powered by POS 130 or 135 and establishes BLUETOOTH Low Energy (BLE) communication link 110 between smartcard 120 and the digital wallet stored in SE 116 of smart phone 125. Smartcard 120 may also be powered by an on-board battery. Smartcard 120 functions as a relay between POS 130 or 135 and smart phone 125 with adequate protocol encapsulation and transformation. On ISO 14443 communication link 117 and ISO 7816 communication link 118, data are transmitted on the physical layer as bytes bundled in Application Protocol Data Units (APDUs). The APDUs become the data payload of BLE communication link 110 and are encrypted according to the BLE standard which provides for full AES-128 encryption using CCM (Counter with CBC-MAC). Because the data payload for BLE is between 8 bytes and 27 bytes, APDUs shorter than the minimum length need to be padded and APDUs longer than the maximum length need to be broken into pieces to comply with the BLE standard.

The actual transaction is processed in the digital wallet stored in SE 116 of smart phone 125. In an embodiment in accordance with the invention, the transaction may be relayed to the user's virtual digital wallet in cloud 115 which includes virtual SE 116 and smart phone 125 is not required to have an SE. Smart phone 125 relays the transaction up to cloud 115 and the actual transaction is processed in the user's virtual digital wallet in cloud 115 using SE 116.

Figure 2:
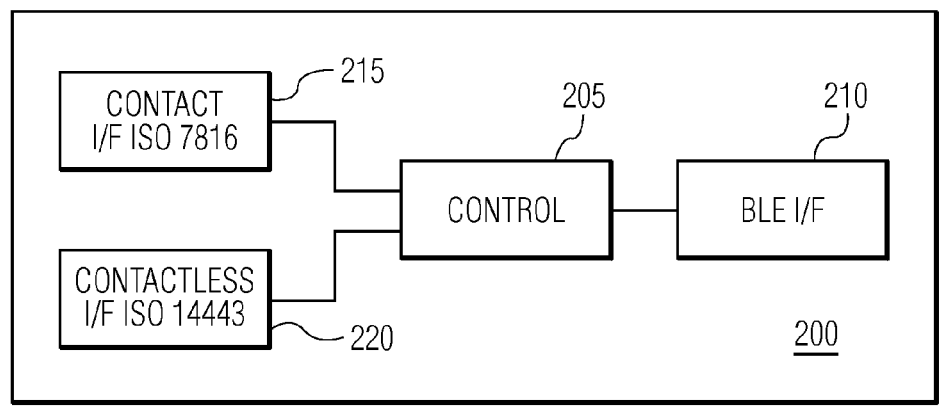
FIG. 2 shows an embodiment in accordance with the invention.

In an embodiment in accordance with the invention, smartcard 120 acts as a communication interface and protocol adapter between POS 130 or 135 and BLUETOOTH Low Energy equipped smart phone 125. FIG. 2 shows adapter chip 200 for smartcard 120 in an embodiment in accordance with the invention. Control logic 205 bridges BLUETOOTH Low Energy Interface (BLE) 210 either to ISO 7816 contact interface 215 or ISO 14443 contactless interface 220 to provide for autonomous bi-directional data transfer between smart phone 125 and POS 130 or 135. Typically all links between interfaces 210, 215 and 220 and control logic 205 are serial UARTs (Universal Asynchronous Receiver Transmitter).

Figure 3:
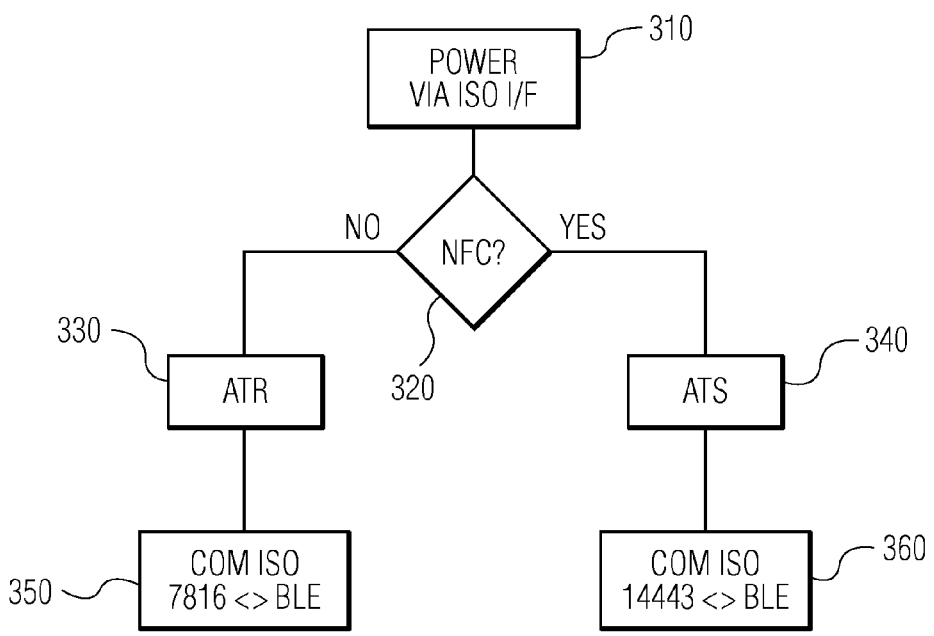
FIG. 3 shows an embodiment in accordance with the invention.

FIG. 3 shows the operation of adapter chip 200 in accordance with the invention. In step 310, power is provided via either contactless interface 220 or contact interface 215 to power smartcard 120 from POS 130 or 135. In step 320, control logic 205 determines whether contactless interface 220 is providing the power or whether contact interface 215 is providing the power to smartcard 120.

If power is provided via contactless interface 220, in step 340 the Answer To Select (ATS) activation sequence is initiated for smartcard 120 upon reception of the Request to Answer To Select (RATS) from POS 135. ATS is part of the activation sequence for smartcards that communicate using ISO 14443. In step 360, a communication link is established between smart phone 125 and POS 135 via smartcard 120 using BLUETOOTH Low Energy (BLE) communication link 110 between smart phone 125 and smartcard 120 and using ISO 14443 communication link 117 between smartcard 120 and POS 135.

If power is provided via contact interface 215, in step 330 smartcard 120 outputs Answer to Reset (ATR) to start communication with POS 130. ATR is a message output by smartcard 120 when using ISO 7816 following electrical reset of smartcard 120 by POS 130. In step 350, a communication link is established between smart phone 125 and POS 130 via smartcard 120 using BLUETOOTH Low Energy (BLE) communication link 110 between smart phone 125 and smartcard 120 and using ISO 7816 communication link 118 between smartcard 120 and POS 130.

Figure 4:
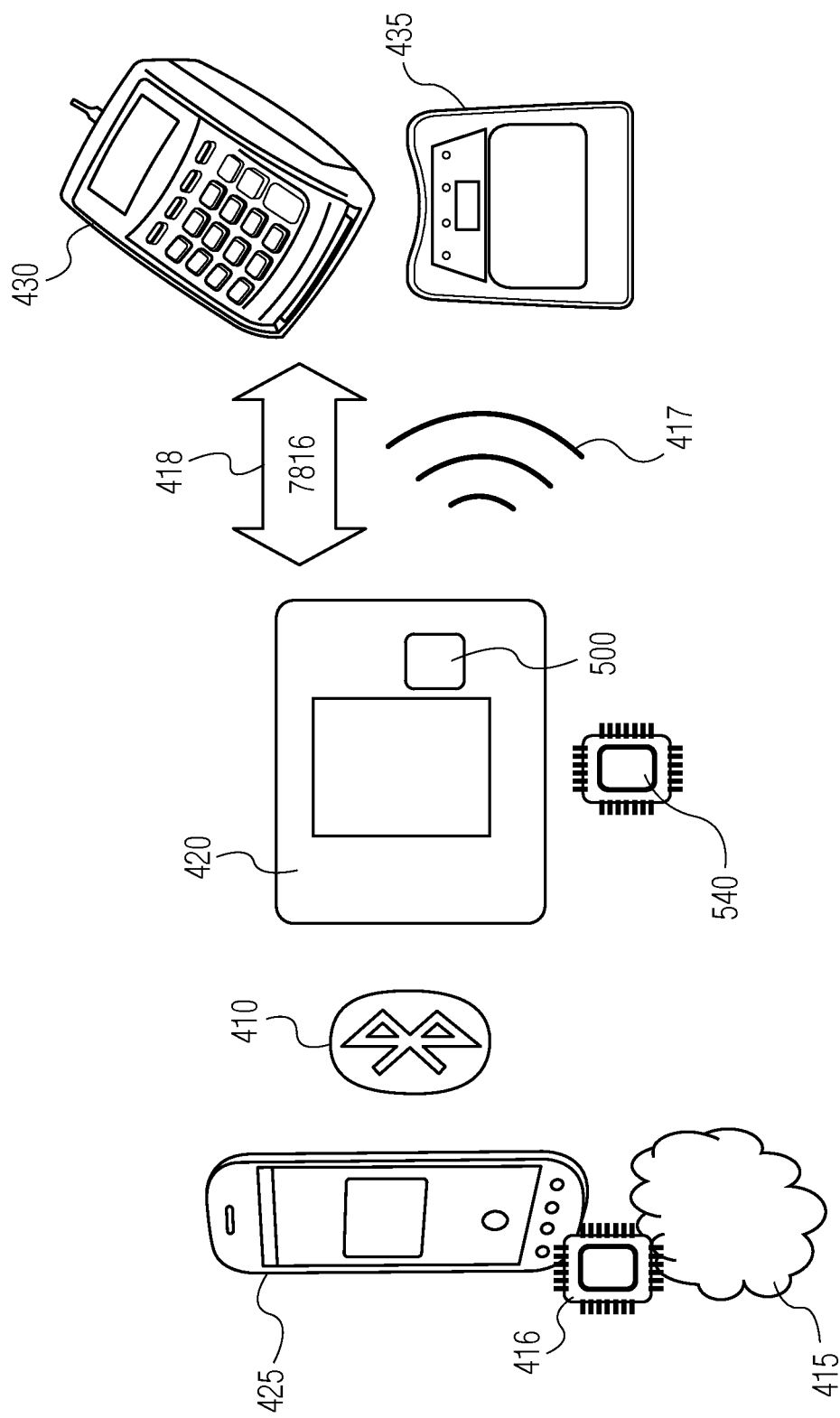
FIG. 4 shows an embodiment in accordance with the invention.

In an embodiment in accordance with the invention in FIG. 4, smartcard 420 has SE 540 which is a typical bankcard type SE as mentioned above. This allows smart phone 425 to function as a user interface, for example, (e.g. for entering PIN numbers) when smart phone 425 does not incorporate an SE but instead smartcard 420 incorporates SE 540.

Having smartcard 420 equipped with SE 540 also provides a fallback solution to address situations where POS 430 or POS 435 cannot operate with smart phone 425 via smartcard 420. For example, the user may not have smart phone 425 with him, the smart phone battery may not have charge or smartcard 420 is inserted into a reader slot and shielded, so that a communication link with smart phone 425 is not possible. Smartcard 420 is typically powered by POS 430 or POS 435 over ISO 7816 communication link 418 or ISO 14443 communication link 417, respectively.

Figure 5:
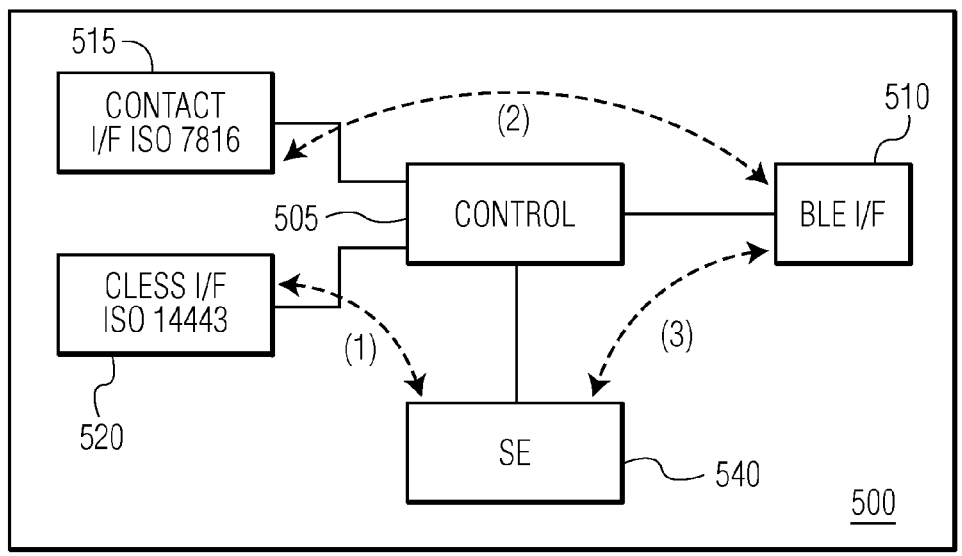
FIG. 5 shows an embodiment in accordance with the invention.

FIG. 5 shows adaptor chip 500. Communication link (1) provides for communication between POS 435 or POS 430 and SE 540 where routing is controlled by control logic 505 and provides for switching to SE 540 if, for example, a communication link to smart phone 425 (having SE 416) is not possible using BLE I/F 410 (e.g., the battery of smart phone 425 is too low or exhausted or the user does not have smart phone 425 with them) or a communication link between smart phone 425 (lacking real SE 416) and cloud 415 is not possible (e.g. data connectivity to cloud 415 is not available).

If smart phone 425 is available and includes real SE 416 or smart phone 425 is able to communicate with virtual SE 416 in cloud 415, FIG. 5 shows communication link (2) is selectable between POS 430 or POS 435 and smart phone 425 using contact I/F (ISO 7816) 515 or contactless IF (ISO 14443) 520 via control logic 505 to BLE I/F 510.

If smart phone 425 is available and does not include an SE but smartcard 420 does include typical bankcard SE 540, communication may be established between POS 430 or POS 435 and SE 540 using communication link (1) and communication between SE 540 and BLE/IF 510 may be established using communication link (3). This allows smart phone 425 to act as a remote user interface to SE 540 in smartcard 420, for example. Communication links (1) and (3) may be in operation simultaneously or alternately.

Figure 6:
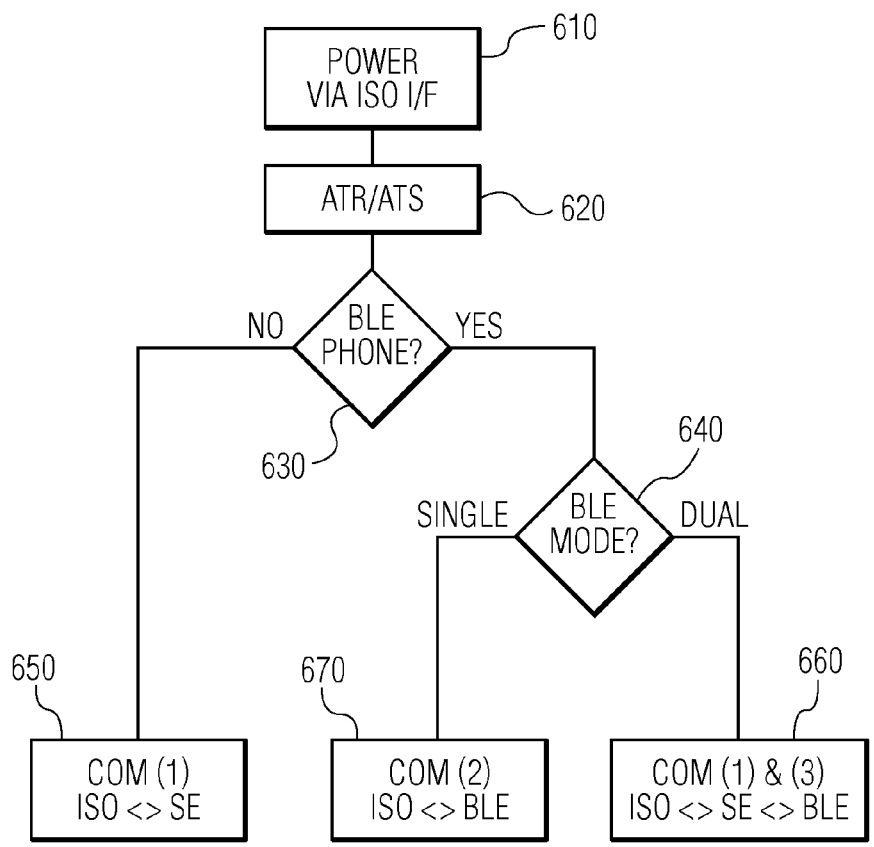
FIG. 6 shows an embodiment in accordance with the invention.

FIG. 6 shows the operation of adapter chip 500 in FIG. 5 in an embodiment in accordance with the invention. In step 610, smartcard 420 is powered via ISO contact interface 515 or ISO contactless interface 520 of POS 430 or POS 435, respectively. In step 620, control logic 505 determines whether contactless interface 520 is providing the power to smartcard 420 or whether contact interface 515 is providing the power to smartcard 420 and then selects the appropriate protocol ATR or ATS for communications. ATR and ATS protocols are slightly different and ATR is selected if POS 430 supplies the power to smartcard 420 and ATS is selected if POS 435 supplies the power to smartcard 420.

Control logic 505 in step 630 determines whether smart phone 425 having BLE capability is available. If not, communication link (1) is established in step 650 between SE 540 of smartcard 420 and contact I/F 515 or contactless I/F 520 by control logic 505. If smart phone 425 having BLE capability is available, in step 640 it is determined whether single or dual mode operation is to be selected. Typically, dual mode is selected in step 640 if smart phone 425 does not have an SE and in step 660 communication link (1) is established between ISO 7816 or ISO 14443 and SE 540 and communication link (3) is established between SE 540 and BLE I/F 510 by control logic 505. If single mode is selected in step 640, communication link (2) between ISO 7816 or ISO 14443 and BLE I/F 510 is established by control logic 505. Note that single mode typically requires that smart phone 425 have real SE 416 or that smart phone 425 can connect to virtual SE 416 in cloud 415.

The invention claimed is:

1. A method for using a smart card comprising control logic, a contact interface, and a contactless interface as a bridge between a point of sale device and a smart phone, the method comprising:
   providing power to the smart card from the point of sale device via one of the contact interface and the contactless interface;
   determining, using the control logic, which interface is receiving the power from the point of sale device;
   initiating an appropriate activation sequence for the interface receiving power; and
   establishing a communication link between the point of sale device and the smart phone via the smart card.

2. The method of claim 1, where the contact interface is an ISO 7816 interface type.

3. The method of claim 1, where the contactless interface is an ISO 14443 interface type.

4. The method of claim 1, further comprising:
   establishing a second communication link between the smart phone and a virtual secure element in a cloud.

5. A method of using a smart card as an adaptor, the method comprising:
   providing power to the smart card from a point of sale device via one of a contact interface and a contactless interface;

determining, using control logic, which interface is receiving the power from the point of sale device, wherein both the contact interface and the contactless interface are coupled to the control logic;

selecting an appropriate communication protocol;

determining whether a smart phone having BLE capability is available; and setting up a communication link between the point of sale device and a secure element of the smart card when the smart phone having BLE capability is not available, wherein the secure element is coupled to the control logic.

6. A method of using a smart card as an adaptor, the method comprising:

providing power to the smart card from a point of sale device via one of a contact interface and a contactless interface;

determining, using the control logic, which interface is receiving the power from the point of sale device, wherein both the contact interface and the contactless interface are coupled to the control logic;

selecting an appropriate communication protocol;

determining whether a smart phone having BLE capability is available; and setting up a first communication link between the point of sale device and the secure element of the smart card and a second communication link between the secure element and a wireless low power short range connectivity low energy interface when the smart phone having BLE capability is available, wherein the secure element is coupled to the control logic.

\* \* \* \* \*